(12) United States Patent
Viniegra (10) Patent No.: US 11,130,451 B2
(45) Date of Patent: Sep. 28, 2021

(54) TAILGATE INTEGRATED TOOLBOX

(71) Applicant: Guillermo Viniegra, Phoenix, AZ (US)

(72) Inventor: Guillermo Viniegra, Phoenix, AZ (US)

( * ) Notice: Subject to any disclaimer, the term of this patent is extended or adjusted under 35 U.S.C. 154(b) by 282 days.

(21) Appl. No.: 16/351,750

(22) Filed: Mar. 13, 2019

(65) Prior Publication Data
US 2020/0290525 A1    Sep. 17, 2020

(51) Int. Cl.
*B60R 11/06* (2006.01)
*B62D 33/027* (2006.01)
*B60R 11/00* (2006.01)

(52) U.S. Cl.
CPC .......... *B60R 11/06* (2013.01); *B62D 33/0273* (2013.01); *B60R 2011/004* (2013.01)

(58) Field of Classification Search
CPC .. B62D 33/0273; B62D 33/03; B62D 33/037; B60R 11/06; B60R 2011/004; B60R 9/06; B60R 9/065
USPC .................. 296/37.5, 37.6, 50, 57.1; 224/404
See application file for complete search history.

(56) References Cited

U.S. PATENT DOCUMENTS

| | | | |
|---|---|---|---|
| 5,498,049 A | 3/1996 | Schlachter | |
| 5,518,158 A | 5/1996 | Matlack | |
| 6,811,067 B2 | 11/2004 | Muizelaar | |
| 6,923,354 B2 | 8/2005 | Axelson | |
| 7,111,884 B2 | 9/2006 | Johnson | |
| 9,308,947 B2 | 4/2016 | Kmita | |
| 10,730,447 B1* | 8/2020 | Hemphill | ................ B60R 9/065 |
| 2007/0196201 A1 | 8/2007 | Kennedy | |
| 2010/0052355 A1* | 3/2010 | McGowan | ......... B62D 33/0273 296/57.1 |
| 2012/0325877 A1 | 12/2012 | Franks | |
| 2020/0180707 A1* | 6/2020 | Johnson | ............. B62D 33/0273 |

FOREIGN PATENT DOCUMENTS

WO    WO200105874    8/2001

* cited by examiner

*Primary Examiner* — Stephen T Gordon (57) ABSTRACT

A tailgate integrated toolbox for efficiently storing tools within a truck tailgate includes a tailgate having at least one storage compartment defined by at least one depression extending from an inner side towards an outer side. A bottom side is configured to be swingingly coupled to a bed of a pickup truck. A lid has a hinged bottom edge coupled to the inner side of the tailgate adjacent the bottom side and extends to a top side and from a left side to a right side. The lid swings from a closed position covering the inner side of the tailgate to an alternate open position perpendicular with the tailgate. A plurality of electrical outlets is coupled within one of the storage compartments and is configured to draw power from an electrical system of the pickup truck to power electronic devices and tools.

15 Claims, 8 Drawing Sheets

TAILGATE INTEGRATED TOOLBOX

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tailgates and more particularly pertains to a new tailgate for efficiently storing tools within a truck tailgate.

BRIEF SUMMARY OF THE INVENTION

An embodiment of the disclosure meets the needs presented above by generally comprising a tailgate having an inner side separated from an outer side, a left side separated from a right side, and a top side separated from a bottom side. The inner side has at least one storage compartment defined by at least one depression extending towards the outer side. The bottom side is configured to be swingingly coupled to a bed of a pickup truck. A pair of latches is coupled to each of the left side and the right side and is configured to selectively engage the bed of the pickup truck to maintain a vertical position. A handle is coupled to the tailgate and is in operational communication with each of the pair of latches to disengage the pair of latches from the bed. A pair of tailgate cables is coupled to each of the left side and the right side and extends to the pickup truck to maintain the tailgate in a horizontal position when the pair of latches is disengaged from the pickup truck. A lid has a hinged bottom edge coupled to the inner side of the tailgate adjacent the bottom side and extends to the top side and from the left side to the right side. The lid swings from a closed position covering the inner side of the tailgate to an alternate open position perpendicular with the tailgate. A plurality of electrical outlets is coupled within one of the storage compartments and is configured to draw power from an electrical system of the pickup truck to power electronic devices and tools.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
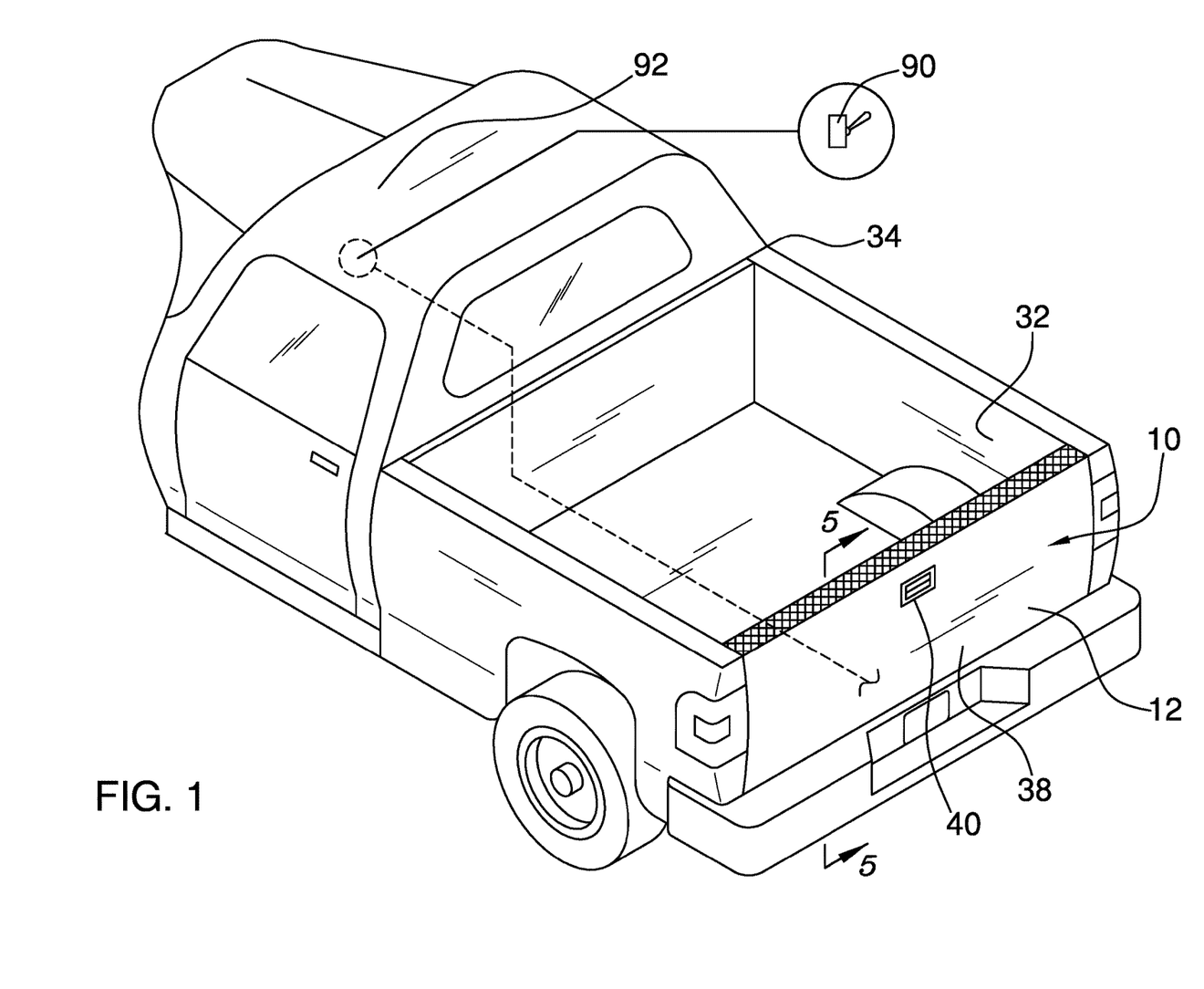
FIG. 1 is an isometric view of a tailgate integrated toolbox according to an embodiment of the disclosure.
Figure 2:
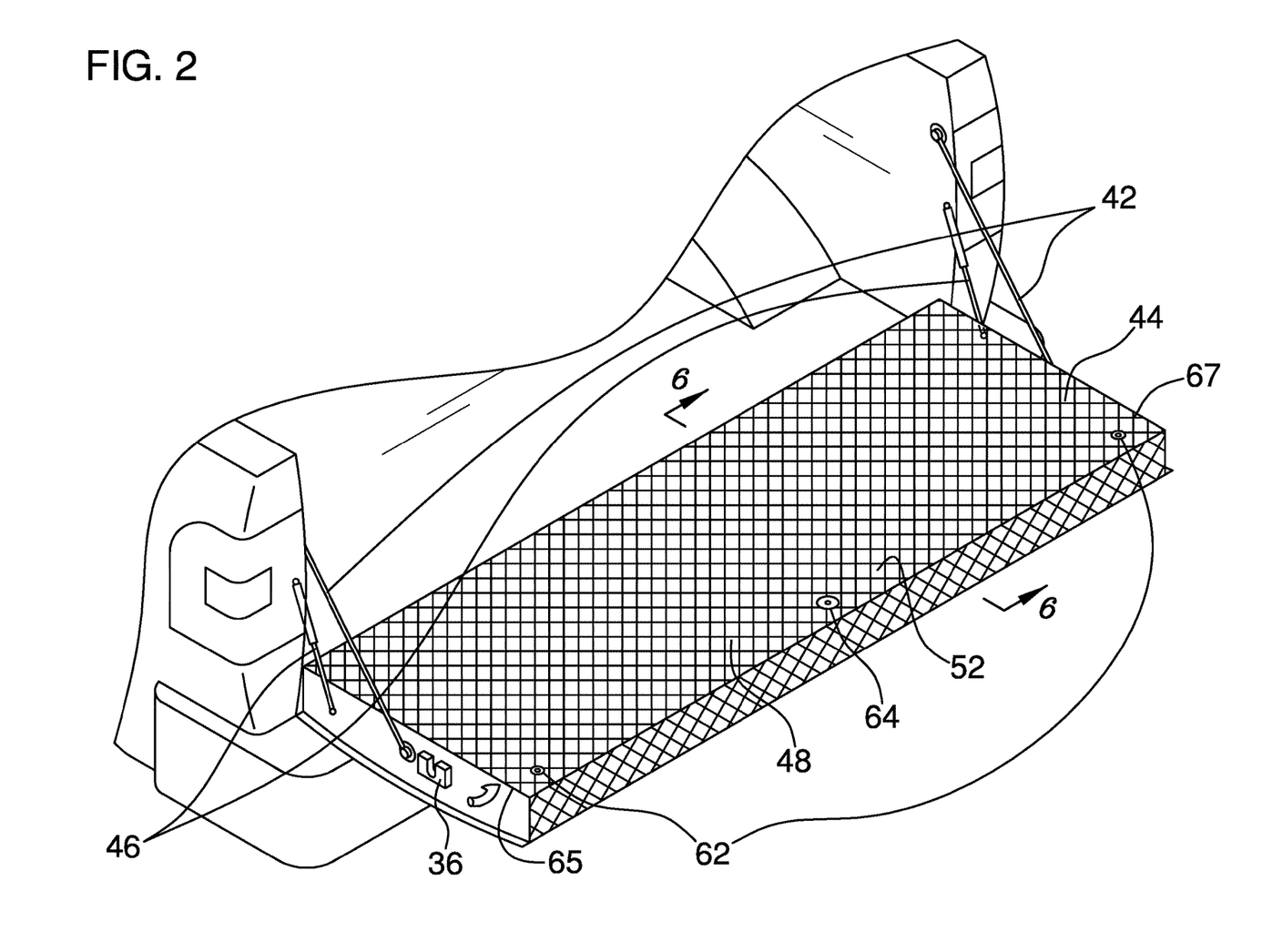
FIG. 2 is an isometric view of an embodiment of the disclosure.
Figure 3:
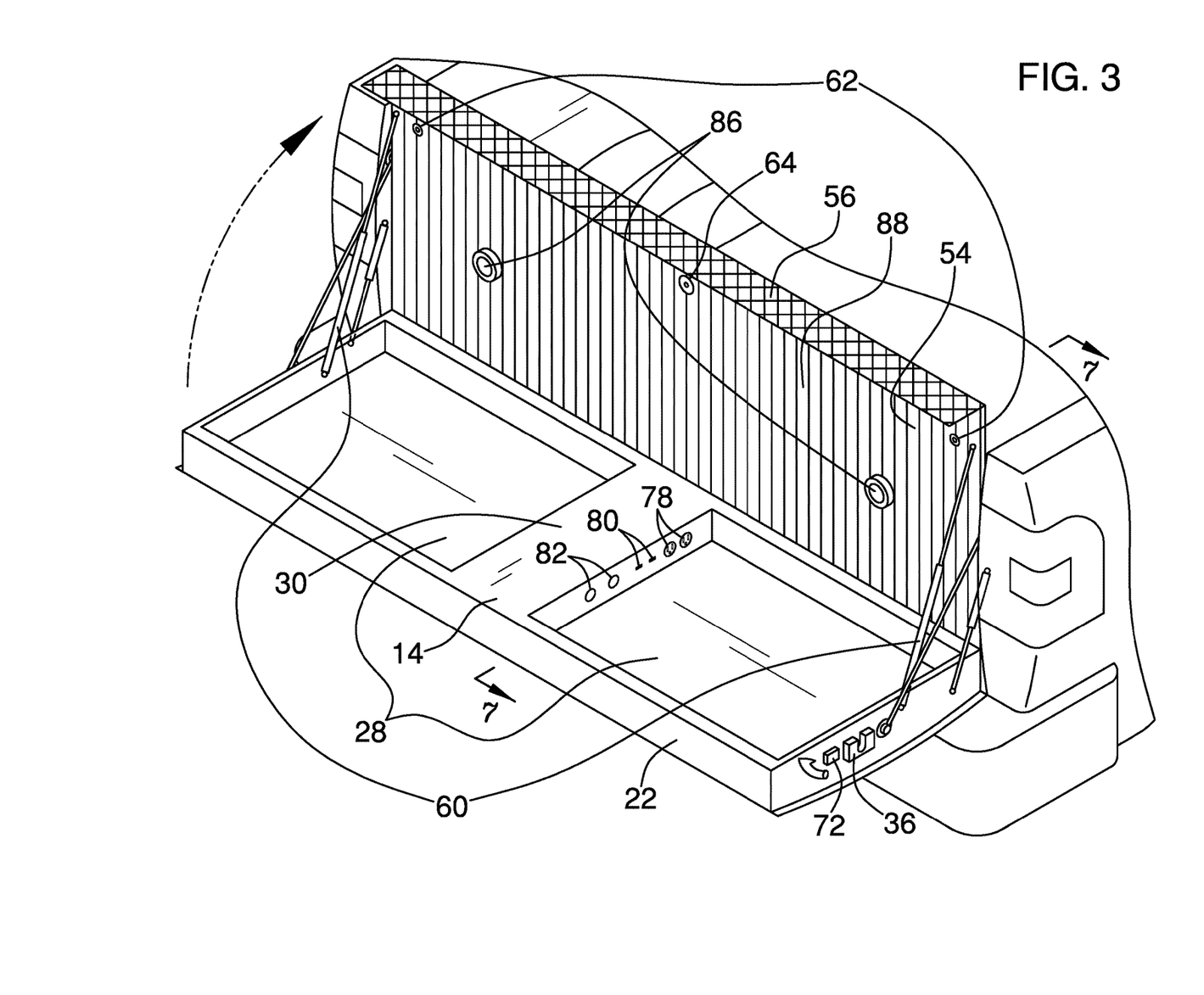
FIG. 3 is an isometric view of an embodiment of the disclosure.
Figure 4:
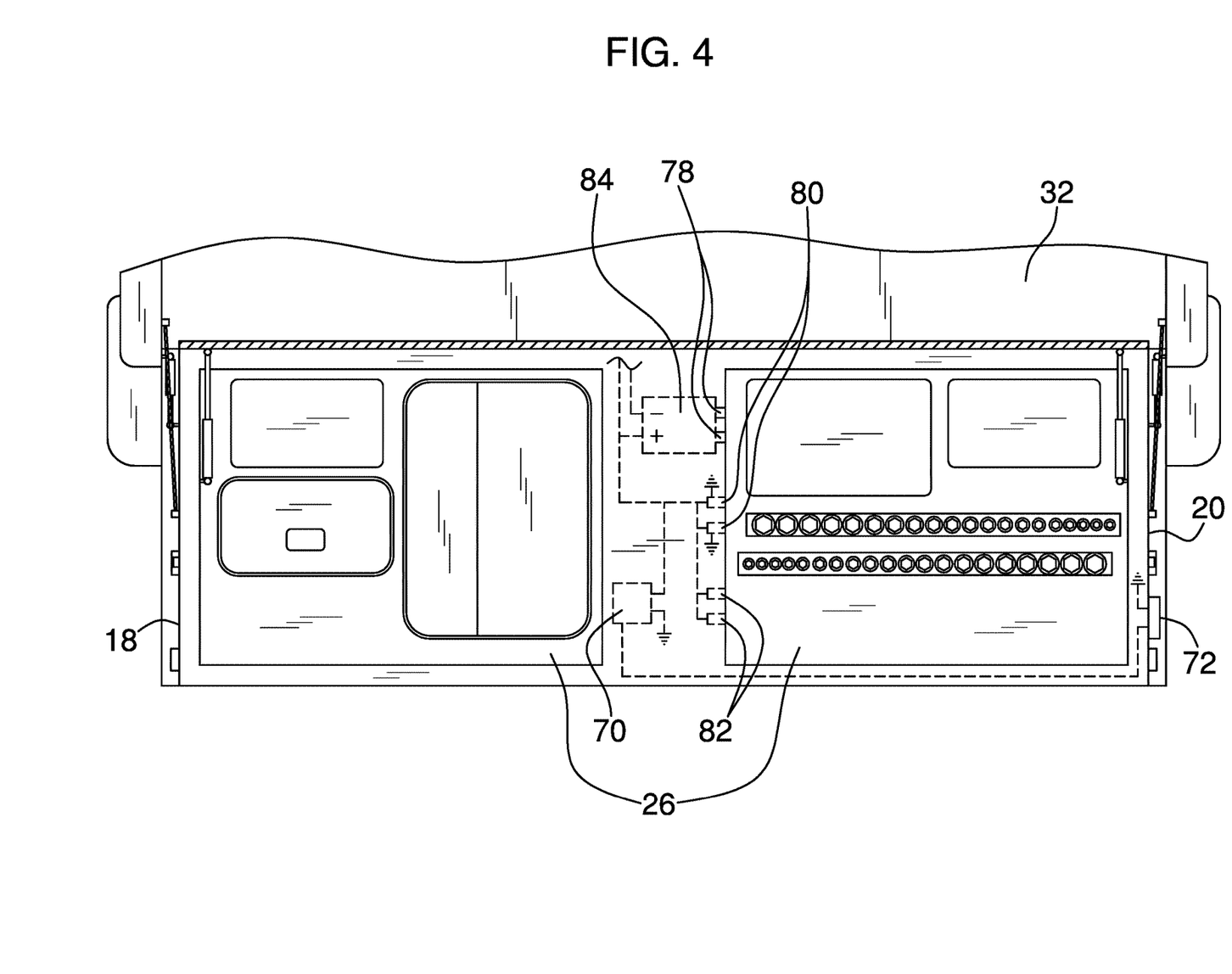
FIG. 4 is a top plan view of an embodiment of the disclosure.
Figure 5:
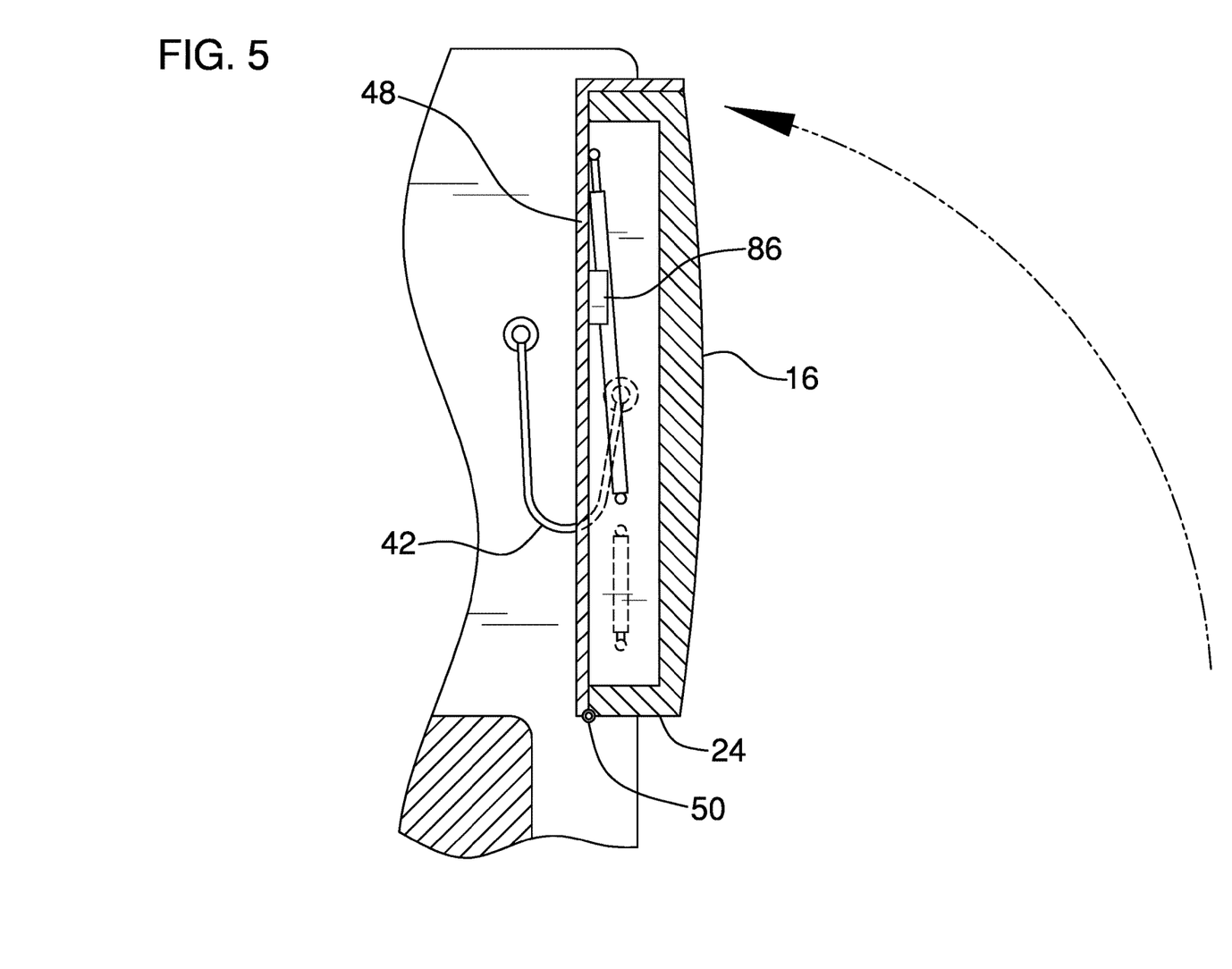
FIG. 5 is a cross-sectional view of an embodiment of the disclosure along line 5-5 of FIG. 1.
Figure 6:
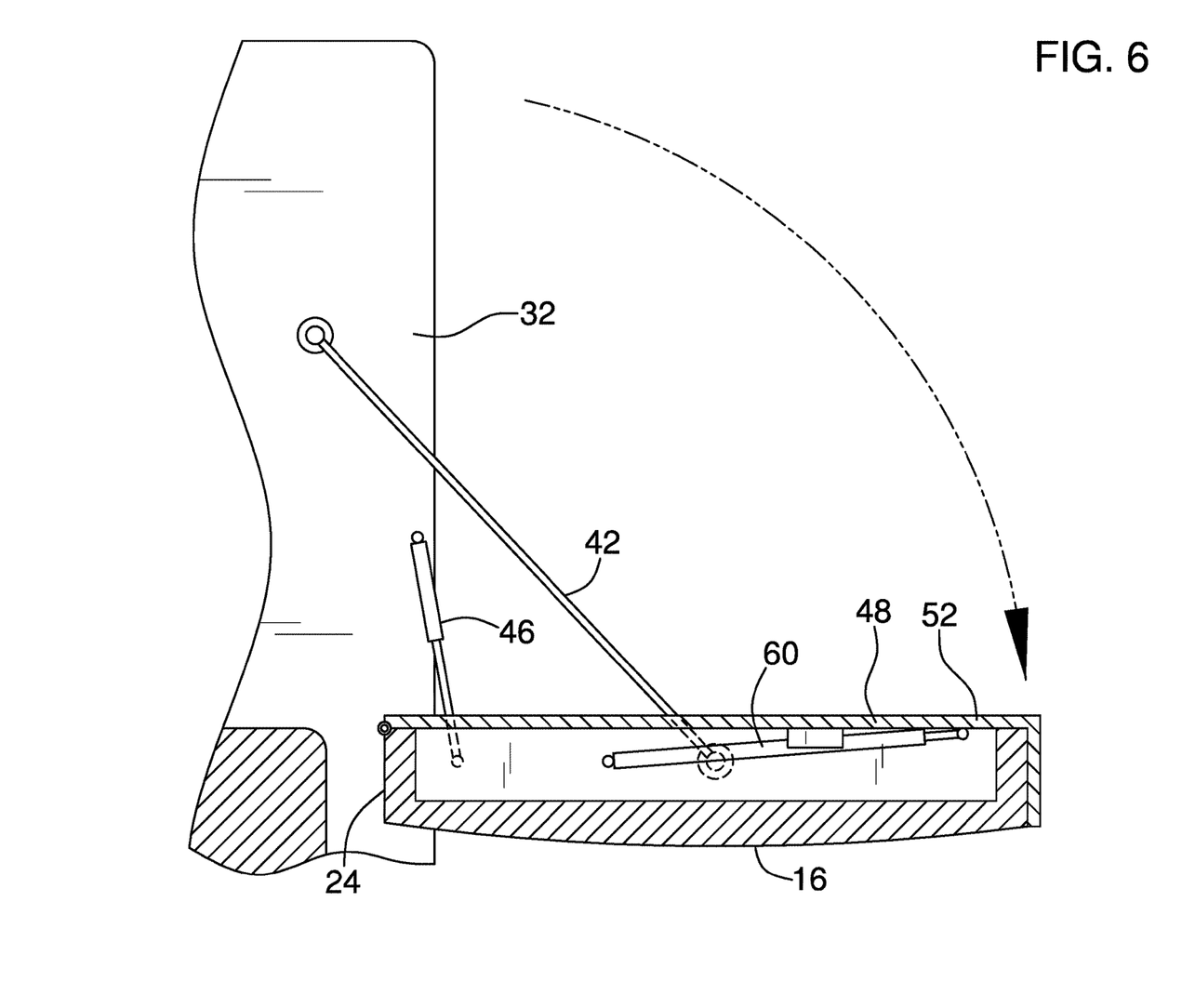
FIG. 6 is a cross-sectional view of an embodiment of the disclosure along line 6-6 of FIG. 2.
Figure 7:
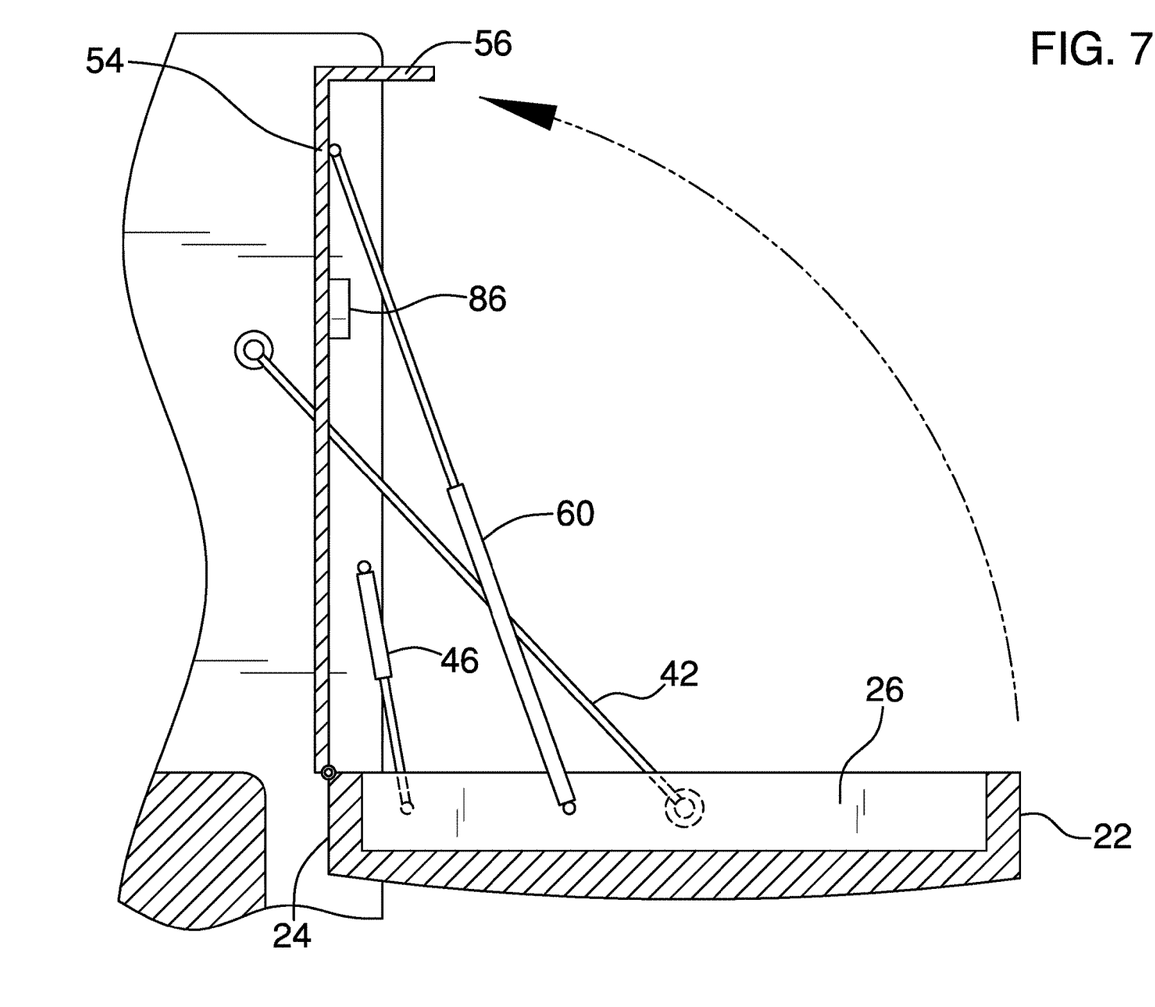
FIG. 7 is a cross-sectional view of an embodiment of the disclosure along line 7-7 of FIG. 3.
Figure 8:
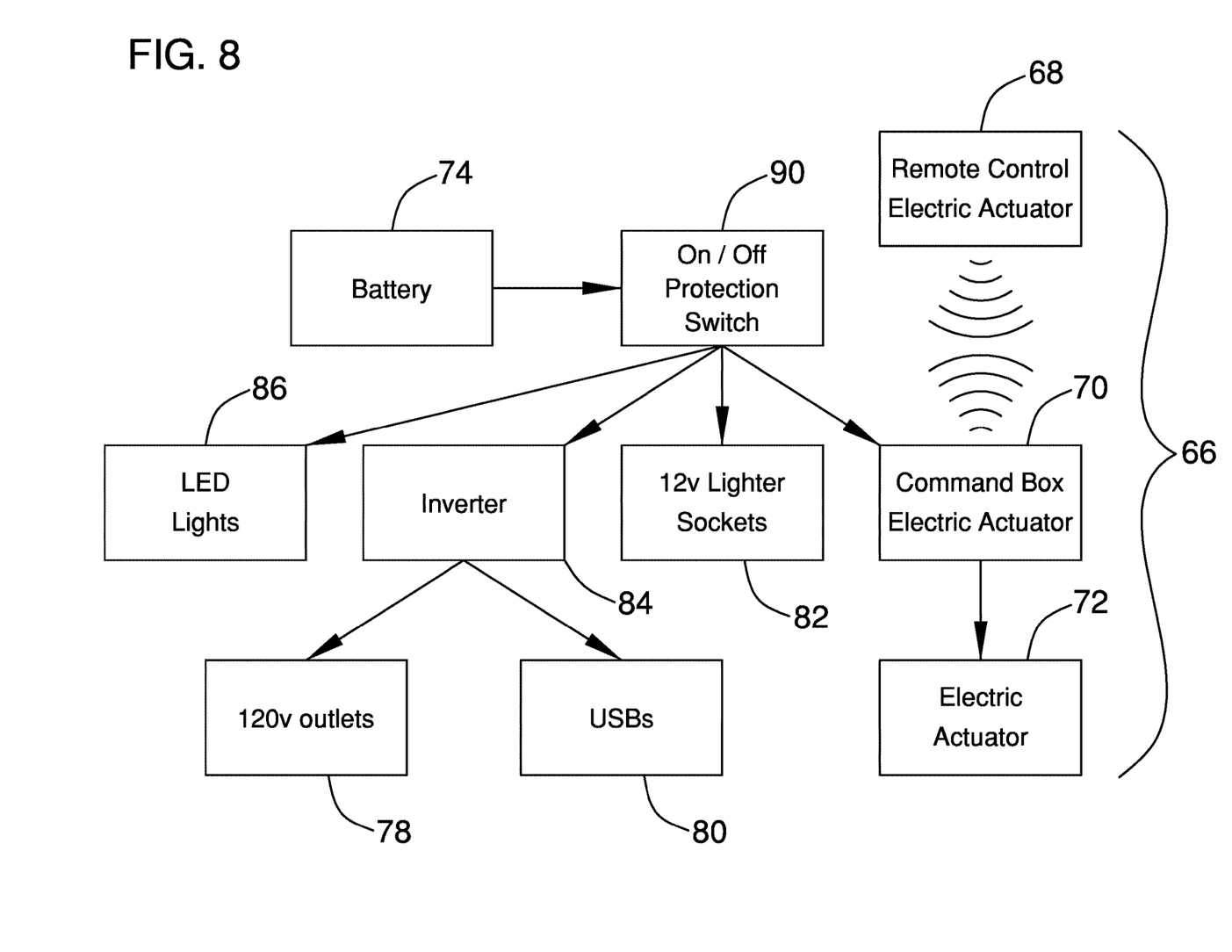
FIG. 8 is a schematic diagram of an embodiment of the disclosure.

With reference now to the drawings, and in particular to FIGS. 1 through 8 thereof, a new tailgate embodying the principles and concepts of an embodiment of the disclosure and generally designated by the reference numeral 10 will be described.

As best illustrated in FIGS. 1 through 8, the tailgate integrated toolbox 10 generally comprises a tailgate 12 having an inner side 14 separated from an outer side 16, a left side 18 separated from a right side 20, and a top side 22 separated from a bottom side 24. The inner side 14 has at least one storage compartment 26 defined by at least one depression 28 extending towards the outer side 16. The at least one storage compartment 26 may be a pair of rectangular storage compartments forming an electrical housing 30 therebetween to maximize storage space within the tailgate 12. The bottom side 24 is configured to be swingingly coupled to a bed 32 of a pickup truck 34.

A pair of latches 36 is coupled to the left side 18 and the right side 20 and is configured to selectively engage the bed 32 of the pickup truck to maintain a vertical position 38. A handle 40 is coupled to the tailgate 12 and is in operational communication with each of the pair of latches 36 to disengage the pair of latches 36 from the bed 32. A pair of tailgate cables 42 is coupled to the left side 18 and the right side 20 and extends to the pickup truck 34 to maintain the tailgate 12 in a horizontal position 44 when the pair of latches 36 is disengaged from the pickup truck 34. A pair of pneumatic tailgate rods 46 may be coupled to the left side 18 and the right side 20 and extends to the pickup truck 34 to slow the movement of the tailgate 12 from the vertical position 38 to the horizontal position 44.

A lid 48 has a hinged bottom edge 50 coupled to the inner side 14 of the tailgate adjacent the bottom side 24 and extends to the top side 22 and from the left side 18 to the right side 20. The lid 48 swings from a closed position 52 covering the inner side 14 of the tailgate to an alternate open position 54 perpendicular with the tailgate 12. The lid 48 may have a top lip 56 perpendicularly extending from a top edge 58 to cover the top side 22 of the tailgate in the closed position 52. The top lip 56 more full seals the inner side 14 of the tailgate and protects the top side 22, particularly when the tailgate is in the vertical position 38. A pair of pneumatic lid lift arms 60 may be coupled between the lid 48 and the inner side 14 of the tailgate. The pair of pneumatic lid lift arms 60 moves the lid from the closed position 52 to the alternate open position 54 and maintains the alternate open position 54 unless forced closed. A plurality of locks 61 comprising a pair of push locks 62 and a key lock 64 is coupled to the lid 48 to selectively engage the lid 48 to the tailgate 12 in the closed position 52 as well as to prevent unwanted access to the storage compartments 26. The pair of push locks 62 is coupled proximal the top edge 58 adjacent a left edge 65 and a right edge 67 of the lid and the key lock 64 is medially coupled proximal the top edge 58.

An actuator system 66 is coupled to the tailgate 12. The actuator system 66 comprises a remote 68, a command box 70 coupled within electrical housing 30 of the tailgate 12, and an electric actuator 72. The command box 70 is in wireless communication with the remote 68 and is configured to be in operational communication with an electrical system 74 of the pickup truck. The electric actuator 72 is coupled to one of the left side 18 or the right side 20 of the tailgate and is in operational communication with the command box 70 and with the pair of latches 36 to disengage the pair of latches 36 from the bed 32 forcing the tailgate 12 to fall to the horizontal position 44.

A plurality of electrical outlets 76 is coupled within one of the storage compartments 26 through the electrical housing 30. The plurality of electrical outlets comprises at least one 120V outlet 78, at least one USB outlet 80, and at least one 12V lighter socket 82. The at least one 120V outlet 78 has an inverter 84 coupled within the electrical housing 30. The plurality of electrical outlets 76 is configured to draw power from the electrical system 74 of the pickup truck to power electronic devices and tools. A pair of LED lights 86 may be coupled to an inner surface 88 of the lid to provide light to each of the pair of storage compartments 26. The pair of LED lights 86 is configured to be in operational communication with the electrical system 74 of the pickup truck and may shine white, red, and has a flashing setting. A switch 90 is coupled within a cab 92 of the pickup truck and is in operational communication with the command box 70, the plurality of electrical outlets 76, and the pair of LED lights 86. The switch 90 is configured to turn off and alternatively turn on power from the electrical system 74 of the pickup truck.

In use, the remote 68 is used to control the electric actuator 72 to disengage the pair of latches 36 and move the tailgate 12 to the horizontal position 44. The key lock 64 is then unlocked and the pair of push locks 62 is released to move the lid 48 to the open position 54. Tools and work equipment stored in the at least one storage compartment 26 may then be accessed and stored, as well as plugged in to the plurality of electrical outlets 76 to use and charge. When finished, the lid 48 is returned to the closed position 52 and the tailgate 12 is returned to the vertical position 38 and the switch 90 may be shut off.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A tailgate integrated toolbox comprising:

a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate, the lid having a top lip perpendicularly extending from a top edge, the top lip covering the top side of the tailgate in the closed position; and a plurality of electrical outlets coupled to the tailgate, the plurality of electrical outlets being coupled within the storage compartment, the plurality of electrical outlets being configured to draw power from an electrical system of the pickup truck to power electronic devices and tools.

2. A tailgate integrated toolbox comprising:

a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate;

a plurality of electrical outlets coupled to the tailgate, the plurality of electrical outlets being coupled within the storage compartment, the plurality of electrical outlets being configured to draw power from an electrical system of the pickup truck to power electronic devices and tools; and a plurality of locks comprising a pair of push locks and a key lock coupled to the lid, the plurality of locks selectively engaging the lid to the tailgate in the closed position, the pair of push locks being coupled proximal a top edge adjacent a left edge and a right edge of the lid and the key lock being medially coupled proximal the top edge.

3. The tailgate integrated toolbox of claim 1 further comprising a pair of pneumatic lid lift arms coupled between the lid and the inner side of the tailgate, the pair of pneumatic lid lift arms moving the lid from the closed position to the alternate open position and maintaining the alternate open position unless forced closed.

4. The tailgate integrated toolbox of claim 1 further comprising an actuator system coupled to the tailgate, the actuator system being in operational communication with the pair of latches to disengage the pair of latches from the bed of the pickup truck forcing the tailgate to fall to the horizontal position.

5. A tailgate integrated toolbox comprising:

a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate;

a plurality of electrical outlets coupled to the tailgate, the plurality of electrical outlets being coupled within the storage compartment, the plurality of electrical outlets being configured to draw power from an electrical system of the pickup truck to power electronic devices and tools; and an actuator system coupled to the tailgate, the actuator system being in operational communication with the pair of latches to disengage the pair of latches from the bed of the pickup truck forcing the tailgate to fall to the horizontal position, the actuator system comprising a remote, a command box coupled within the tailgate, and an electric actuator coupled to one of the left side or the right side of the tailgate, the command box being in wireless communication with the remote and being configured to be in operational communication with the electrical system of the pickup truck, the electric actuator being in operational communication with the command box and with the pair of latches to disengage the pair of latches from the bed.

6. A tailgate integrated toolbox comprising:

a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate;

a plurality of electrical outlets coupled to the tailgate, the plurality of electrical outlets being coupled within the storage compartment, the plurality of electrical outlets being configured to draw power from an electrical system of the pickup truck to power electronic devices and tools; and a pair of pneumatic tailgate rods coupled to the tailgate, the pair of pneumatic tailgate rods being coupled to each of the left side and the right side and extending to the pickup truck to slow movement of the tailgate from the vertical position to the horizontal position.

7. A tailgate integrated toolbox comprising:
a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;
a pair of latches coupled to the tailgate, the pair of latches being coupled to the left side and the right side and configured to selectively engage the bed of the pickup truck to maintain a vertical position of the tailgate;
a handle coupled to the tailgate, the handle being in operational communication with each of the pair of latches to disengage the pair of latches from the bed;
a pair of tailgate cables coupled to the tailgate, the pair of tailgate cables being coupled to the left side and the right side and extending to the pickup truck to maintain the tailgate in a horizontal position when the pair of latches is disengaged from the pickup truck;
a pair of pneumatic tailgate rods coupled to the tailgate, the pair of pneumatic tailgate rods being coupled to the left side and the right side and extending to the pickup truck to slow movement of the tailgate from the vertical position to the horizontal position;
a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate, the lid having a top lip perpendicularly extending from a top edge, the top lip covering the top side of the tailgate in the closed position;
a pair of pneumatic lid lift arms coupled between the lid and the inner side of the tailgate, the pair of pneumatic lid lift arms moving the lid from the closed position to the alternate open position and maintaining the alternate open position unless forced closed;
a plurality of locks comprising a pair of push locks and a key lock coupled to the lid, the plurality of locks selectively engaging the lid to the tailgate in the closed position, the pair of push locks being coupled proximal the top edge adjacent a left edge and a right edge of the lid and the key lock being medially coupled proximal the top edge;
an actuator system coupled to the tailgate, the actuator system comprising:
  a remote;
  a command box coupled within the tailgate, the command box being in wireless communication with the remote and being configured to be in operational communication with an electrical system of the pickup truck; and
  an electric actuator coupled to one of the left side or the right side of the tailgate, the electric actuator being in operational communication with the command box and with the pair of latches to disengage the pair of latches from the bed forcing the tailgate to fall to the horizontal position; and
a plurality of electrical outlets coupled to the tailgate, the plurality of electrical outlets being coupled within the storage compartment, the plurality of electrical outlets being configured to draw power from the electrical system of the pickup truck to power electronic devices and tools.

8. The tailgate integrated toolbox of claim 7 further comprising the storage compartment being one of a pair of rectangular storage compartments, the inner side of the tailgate forming an electrical housing therebetween.

9. The tailgate integrated toolbox of claim 8 further comprising the plurality of electrical outlets being coupled through the electrical housing and comprising at least one 120V outlet, at least one USB outlet, and at least one 12V lighter socket, the at least one 120V outlet having an inverter coupled within the electrical housing.

10. The tailgate integrated toolbox of claim 8 further comprising a pair of LED lights coupled to an inner surface of the lid, the pair of LED lights providing light to each of the pair of storage compartments, the pair of LED lights being configured to be in operational communication with the electrical system of the pickup truck.

11. The tailgate integrated toolbox of claim 7 further comprising a switch coupled within a cab of the pickup truck, the switch being in operational communication with the command box and the plurality of electrical outlets and configured to turn off and alternatively turn on power from the electrical system of the pickup truck.

12. The tailgate integrated toolbox of claim 1 further comprising the storage compartment being one of a pair of rectangular storage compartments, the inner side of the tailgate forming an electrical housing therebetween.

13. A tailgate integrated toolbox comprising:
a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;
a pair of latches coupled to the tailgate, the pair of latches being coupled to the left side and the right side and configured to selectively engage the bed of the pickup truck to maintain a vertical position of the tailgate;
a handle coupled to the tailgate, the handle being in operational communication with each of the pair of latches to disengage the pair of latches from the bed;
a pair of tailgate cables coupled to the tailgate, the pair of tailgate cables being coupled to the left side and the right side and extending to the pickup truck to maintain the tailgate in a horizontal position when the pair of latches is disengaged from the pickup truck;
a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate;
a plurality of electrical outlets coupled to the tailgate, the plurality of electrical outlets being coupled within the storage compartment, the plurality of electrical outlets being configured to draw power from an electrical system of the pickup truck to power electronic devices and tools;
the storage compartment being one of a pair of rectangular storage compartments, the inner side of the tailgate forming an electrical housing therebetween; and
the plurality of electrical outlets being coupled through the electrical housing and comprising at least one 120V outlet, at least one USB outlet, and at least one 12V lighter socket, the at least one 120V outlet having an inverter coupled within the electrical housing.

14. A tailgate integrated toolbox comprising:

a tailgate having an inner side separated from an outer side, a left side separated from a right side, and a top side separated from a bottom side, the inner side having a storage compartment defined by a depression extending towards the outer side, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate;

a plurality of electrical outlets coupled to the tailgate, the plurality of electrical outlets being coupled within the storage compartment, the plurality of electrical outlets being configured to draw power from an electrical system of the pickup truck to power electronic devices and tools;

the storage compartment being one of a pair of rectangular storage compartments, the inner side of the tailgate forming an electrical housing therebetween; and a pair of LED lights coupled to an inner surface of the lid, the pair of LED lights providing light to each of the pair of storage compartments, the pair of LED lights being configured to be in operational communication with the electrical system of the pickup truck.

15. A tailgate integrated toolbox comprising:

a tailgate having an inner side separated from an outer side, a left side separated from a right side, and a top side separated from a bottom side, the inner side having a storage compartment defined by a depression extending towards the outer side, the storage compartment being one of a pair of rectangular storage compartments, the inner side of the tailgate forming an electrical housing therebetween, the bottom side being configured to be swingingly coupled to a bed of a pickup truck;

a pair of latches coupled to the tailgate, the pair of latches being coupled to the left side and the right side and configured to selectively engage the bed of the pickup truck to maintain a vertical position of the tailgate;

a handle coupled to the tailgate, the handle being in operational communication with each of the pair of latches to disengage the pair of latches from the bed;

a pair of tailgate cables coupled to the tailgate, the pair of tailgate cables being coupled to the left side and the right side and extending to the pickup truck to maintain the tailgate in a horizontal position when the pair of latches is disengaged from the pickup truck;

a pair of pneumatic tailgate rods coupled to the tailgate, the pair of pneumatic tailgate rods being coupled to the left side and the right side and extending to the pickup truck to slow movement of the tailgate from the vertical position to the horizontal position;

a lid coupled to the tailgate, the lid having a hinged bottom edge coupled to the inner side adjacent the bottom side and extending to the top side and from the left side to the right side, the lid swinging from a closed position covering the inner side of the tailgate to an alternate open position perpendicular with the tailgate, the lid having a top lip perpendicularly extending from a top edge, the top lip covering the top side of the tailgate in the closed position;

a pair of pneumatic lid lift arms coupled between the lid and the inner side of the tailgate, the pair of pneumatic lid lift arms moving the lid from the closed position to the alternate open position and maintaining the alternate open position unless forced closed;

a plurality of locks comprising a pair of push locks and a key lock coupled to the lid, the plurality of locks selectively engaging the lid to the tailgate in the closed position, the pair of push locks being coupled proximal the top edge adjacent a left edge and a right edge of the lid and the key lock being medially coupled proximal the top edge;

an actuator system coupled to the tailgate, the actuator system comprising:
a remote;
a command box coupled within the tailgate, the command box being in wireless communication with the remote and being configured to be in operational communication with an electrical system of the pickup truck; and
an electric actuator coupled to one of the left side or the right side of the tailgate, the electric actuator being in operational communication with the command box and with the pair of latches to disengage the pair of latches from the bed forcing the tailgate to fall to the horizontal position;

a plurality of electrical outlets coupled to the tailgate, the plurality of electrical outlets being coupled within one of the storage compartments through the electrical housing and comprising at least one 120V outlet, at least one USB outlet, and at least one 12V lighter socket, the at least one 120V outlet having an inverter coupled within the electrical housing, the plurality of electrical outlets being configured to draw power from the electrical system of the pickup truck to power electronic devices and tools;

a pair of LED lights coupled to an inner surface of the lid, the pair of LED lights providing light to each of the pair of storage compartments, the pair of LED lights being configured to be in operational communication with the electrical system of the pickup truck; and a switch coupled within a cab of the pickup truck, the switch being in operational communication with the command box, the plurality of electrical outlets, and the pair of LED lights and configured to turn off and alternatively turn on power from the electrical system of the pickup truck.

* * * * *